May 6, 1952
T. B. LAVELLE ET AL
2,595,395
POWER UNIT AND WAGON UNLOADER
Filed Nov. 20, 1948
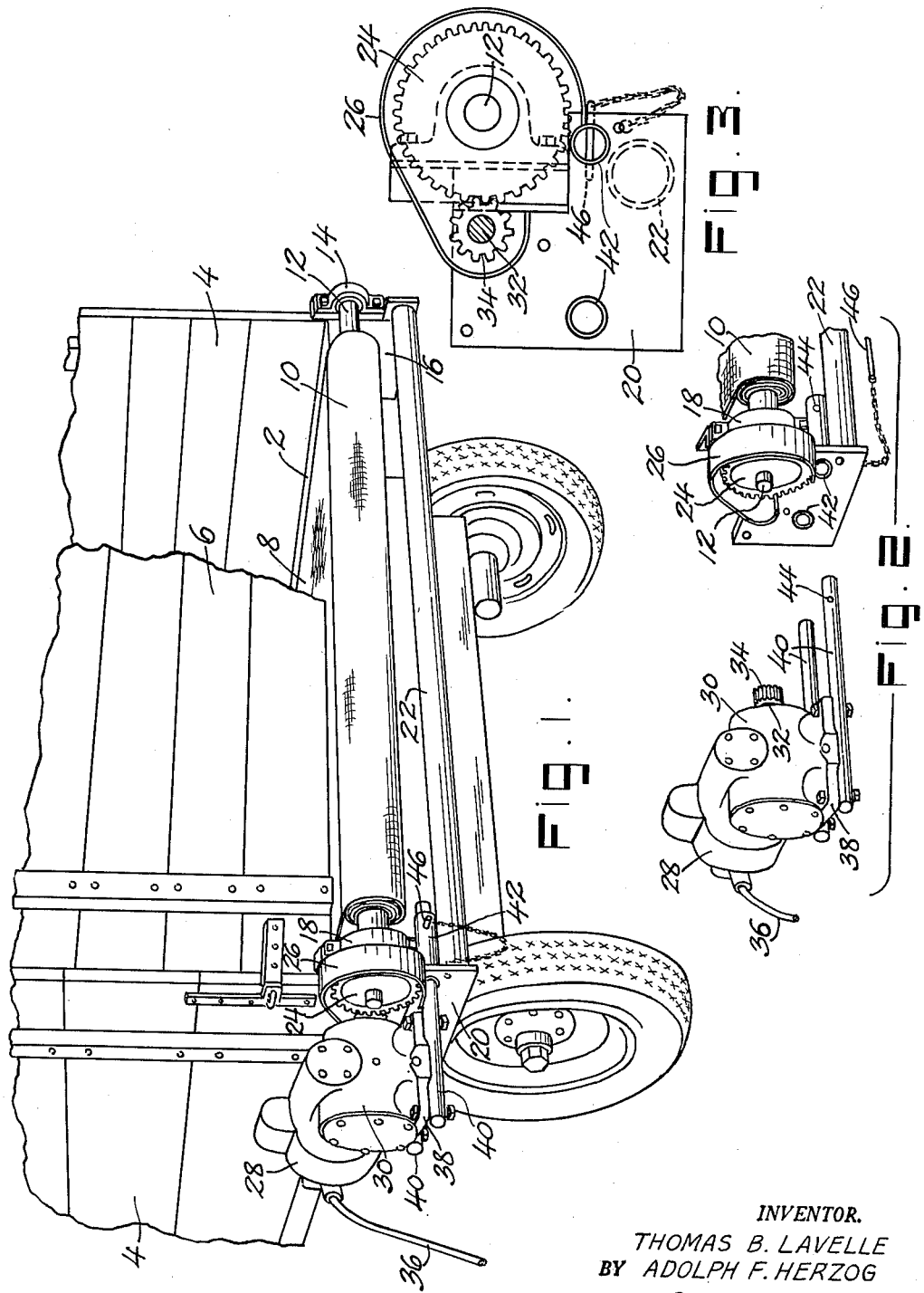
INVENTOR.
THOMAS B. LAVELLE
BY ADOLPH F. HERZOG
Albert Sperry.
ATTORNEY Patented May 6, 1952

2,595,395

UNITED STATES PATENT OFFICE 2,595,395

POWER UNIT AND WAGON UNLOADER

Thomas B. Lavelle, Churchville, and
Adolph F. Herzog, Newtown, Pa.

Application November 20, 1948, Serial No. 61,262

12 Claims. (Cl. 214—83.34)

This invention relates to portable power units for use on farm equipment and as hereafter described and shown is particularly directed to power units for wagon unloading mechanisms.

Wagon unloaders are frequently employed for discharging loads of grain, vegetables, ensilage and other products onto a conveyor or onto the floor of a barn or elsewhere. For this purpose the mechanism generally includes a movable floor member or fabric sheet which extends the full length of the wagon body and on which the load is deposited. The floor member passes about a roller at the rear of the wagon so that when the roller is rotated the floor member carries the load rearwardly to discharge it from the wagon.

The load is usually heavy and therefore it is not practical to operate the roller by hand power. On the other hand, power units are too expensive to warrant applying such a unit to every wagon or to a large number of wagons. For this reason it is usual to employ a single portable power unit and to connect the unit to each wagon in turn as it is brought to an unloading station. The portable units heretofore employed have been mounted on a truck or support independent of the wagon. However, it is not always possible to align such units properly with respect to the wagon, and therefore flexible drive shafts or complicated and expensive universal joints have to be provided. Moreover, the torque exerted on the support is frequently so great as to cause the support to upset or to vibrate and wobble during operation. For these reasons prior power units have been expensive to produce and frequently have been unsatisfactory in operation.

In accordance with the present invention, these objections to constructions of the prior art are overcome and a portable power unit is provided which may be easily and quickly applied to a wagon having unloading mechanism thereon or to other farm equipment such as conveyor mechanism or the like. These results are preferably attained by providing the wagon and the power unit with complementary means for securing the unit directly in place on the wagon or equipment. The engaging elements of the power unit and equipment are thus maintained accurately in alignment or connection at all times during operation and the torque exerted by the power unit is applied directly to the wagon itself.

One of the objects of the present invention is to provide a novel type of power unit adapted for use with farm equipment such as wagon unloading mechanisms.

Another object of the present invention is to provide novel supporting and positioning means for removably securing a power unit to farm equipment.

A further object of the present invention is to provide simple and durable means for actuating a wagon unloader.

A particular object of the present invention is to provide a wagon unloader with a roller for actuating a floor member and a power unit removably mounted on the wagon by which the roller is carried for actuating said roller.

These and other objects and features of the present invention will appear from the following description thereof in which reference is made to the figures of the accompanying drawing.

In the drawing:

Fig. 1 is a perspective showing a portion of a wagon having unloading mechanism thereon and typical means embodying the present invention for actuating such mechanism;

Fig. 2 is a perspective showing the power unit and parts of the wagon unloader of Fig. 1 as seen in separated relation; and Fig. 3 is a vertical sectional view through the construction illustrated in Fig. 1.

In that form of the invention chosen for purposes of illustration in the drawing, the wagon is provided with a bottom floor or bed 2 and side walls 4 and a tail gate 6. The wagon, of course, may be of any conventional type and as shown is equipped with the unloading mechanism including a movable floor member in the form of a sheet of canvas or fabric 8 secured at its rear end to the roller 10 and extending forward from the roller to the front of the wagon body. A load charged into the wagon will rest on the sheet or movable floor member 8 and when the roller 10 is rotated the sheet will be moved rearward so as to discharge the load from the wagon while the sheet is wound up on the roller.

The roller 10 is located at the rear of the bed 2 of the wagon below the upper face of the bed and is provided with a shaft 12, one end of which is mounted in a bearing 14 carried by a plate 16 secured to the wagon body. The opposite end of the shaft 12 is mounted in the bearing block 18 mounted on the plate 20 secured to the wagon body on the side thereof opposite to the plate 16. A reinforcing cross bar or tube 22 extends between plates 16 and 20 below the roller 10 and serves to hold the plates and bearings in position even when the roller is placed under severe strain in drawing a heavy load rearward with the sheet 8.

Shaft 12 has a gear 24 secured thereto and located adjacent the outer face of the plate 20 and close to the bearing block 18. A curved shield or housing member 26 is secured to the plate 20 and extends about the gear 24. The shield is also extended forward beyond gear 24 to protect the driving pinion of the power unit so as to prevent material being discharged from the wagon from coming into contact with the gears during operation.

The power unit illustrated embodies a motor 28 and a reduction gear 30 from which extends a shaft 32 carrying the driving pinion 34. The pinion 34 is formed to mesh with the gear 24 for rotating the gear 24, shaft 12 and roller 10. The motor is preferably an electrical motor which receives current from the power line 36. The motor 28 and reduction gear 30 are mounted on a supporting plate 38 to the lower face of which are secured the positioning bars 40. These bars project from the plate 38 beyond the pinion 34 and are arranged to be received by the complementary tubular members 42 fixedly secured to the plate 20 mounted on the wagon body. The bars 40 and tubular members 42 preferably extend in a direction parallel to the teeth of the driving pinion and gear so that in sliding the power unit into operating position the teeth of the pinion and gear will slide into proper meshing engagement. When a spur gear and pinion are used, the positioning bars and tubular members extend parallel to the axes of the pinion and gear so that there is no tendency for the torque or forces applied to the unit and wagon to cause the unit to become loosened or displaced during operation. In practice the tubular members 42 are preferably inclined downward slightly so that the inner ends of the members are somewhat lower than the outer ends through which the positioning bars 40 are inserted. In this way the tubular members may be made sufficiently large to permit insertion of the bars 40 without difficulty and yet sagging of the power unit is overcome by engagement of the bars 40 with the lower surfaces of the tubular members adjacent the plate 20 and the upper surfaces of the tubular members adjacent the inner ends thereof. When so positioned the axis of pinion 34 is accurately positioned parallel to the axis of the gear 12 and teeth of the pinion and gear are in proper meshing relation.

With this construction the power unit may be applied to the wagon body very easily by lifting the unit so that the positioning bars may be slipped into the complementary tubular members 42 mounted on the plate 20 carried by the wagon body. In applying the power unit, the driving pinion 34 is moved into meshing engagement with the gear 24 on shaft 12 so that the pinion may drive the shaft and rotate the roller 10 for drawing the movable floor member or fabric sheet rearward to discharge the load. The rear bar 40 and the rear tubular members 42 may be provided with complementary holes as indicated at 44 through which the locking pin 46 is passed to prevent the power unit from being displaced after it is moved into operating position. When the unit is thus positioned and locked in place, power is supplied to the motor 28 so that the roller 10 is rotated slowly or at the desired speed for moving the load rearward to discharge it from the wagon. When the load has been discharged, the motor is stopped, the pin 46 is withdrawn from the openings 44 in the positioning bar and tubular member whereupon the power unit may be pulled outward away from the wagon body so as to disengage the driving pinion 34 from the gear 24. The roller 10 is then free to rotate so that the movable floor member or sheet may be drawn forward over the bed of the wagon body into position to receive another load. The wagon then may move off so that another wagon having similar wagon unloading means may be moved into position to discharge its load. The power unit is then applied to the second wagon and the unloading operation is repeated.

The elements of the unloading mechanism and power unit are extremely simple in construction and relatively economical to produce. At the same time the power unit may be applied and removed easily whereas the torque and other forces exerted on the power unit during operation are applied to the wagon body. The mechanism of the wagon unloader which is carried by each wagon is relatively inexpensive and therefore a large number of wagons may be provided with the unloading mechanism at small cost. Only one power unit is then required for discharging loads from any number of wagons that may be available or required for use on farms or elsewhere. Furthermore the power unit is adapted for application to numerous other types of farm equipment such as conveying mechanisms where it is desired to apply substantial forces for movement at relatively low speeds.

Numerous changes and modifications may be made in the form, construction and arrangement of the elements of the power unit and wagon unloader as well as the means employed for detachably mounting the power unit on wagons or other farm equipment. In view thereof it should be understood that the particular construction shown in the drawing and herein described is intended to be illustrative only and is not intended to limit the scope of the invention.

We claim:

1. In combination with farm equipment which has a gear thereon for actuating the equipment, a power unit comprising a support having a motor thereon, a driving pinion connected to said motor and having teeth thereon formed to engage the teeth of said gear on the farm equipment, and positioning means secured to said support and equipment and having a loose interfitting relation to permit ready application and removal of said unit from said equipment, said means presenting relatively inclined surfaces movable into supporting engagement to hold said pinion and gear in driving relation.

2. In combination with farm equipment which has a gear thereon for actuating the equipment, a power unit comprising a support having a motor thereon, a driving pinion connected to said motor and having teeth thereon formed to engage the teeth of said gear on the farm equipment, and positioning means secured to said support and extending parallel to the teeth on said pinion for guiding said pinion into and out of operative engagement with said gear in applying and removing the power unit said equipment having complementary positioning means thereon loosely receiving the positioning means on said support and inclined with respect thereto to insure accurate positioning of the pinion and gear while compensating for sagging of the power unit due to the loose fitting of the positioning means.

3. In combination with farm equipment which has a gear thereon for actuating the equipment, a power unit comprising a support having a motor thereon, a driving pinion connected to said motor and having teeth thereon formed to engage the teeth of said gear on the farm equipment, positioning means secured to said support and extending parallel to the teeth on said pinion for guiding said pinion into and out of operative engagement with said gear, and relatively inclined means carried by said support and positioning means for securing said unit in place on the farm equipment with the teeth on said pinion in mesh with the teeth on said gear.

4. In combination with a wagon having unloading means thereon including a movable floor member and a roller about which said floor member passes, a gear connected to said roller for rotating the same, a power unit including a motor, a reduction gear and a driving pinion, a support on which the motor and reduction gear are mounted, and loosely interfitting cooperating means on the wagon and support presenting relatively inclined surfaces engageable for holding said unit in position with said driving pinion in engagement with said gear while permitting ready application and removal of said unit.

5. In combination with a wagon having unloading means thereon including a movable floor member and a roller about which said floor member passes, plates secured to said wagon near the opposite sides thereof and having bearings in which said roller is rotatably mounted, a gear located adjacent one of said plates and connected to said roller for rotating the same, a power unit including a motor, a reduction gear and a driving pinion, a support on which the motor and reduction gear are mounted, and means on the support extending parallel to the teeth on said pinion and gear and slidably engageable with the plate adjacent said gear for guiding said pinion into and out of meshing engagement with said gear.

6. In combination with a wagon having unloading means thereon including a movable floor member and a roller about which said floor member passes, plates secured to said wagon near the opposite sides thereof and having bearings in which said roller is rotatably mounted, a gear located adjacent one of said plates and connected to said roller for rotating the same, a power unit including a motor, a reduction gear and a driving pinion, a support on which the motor and reduction gear are mounted, means on the support extending parallel to the teeth on said pinion and gear and slidably engageable with the plate adjacent said gear for guiding said pinion into and out of meshing engagement with said gear, and means for locking said unit in position on said plate with said pinion in mesh with said gear.

7. In combination with a wagon having unloading means thereon including a movable floor member and a roller about which said floor member passes, a gear connected to said roller for rotating the same, a power unit including a motor, a reduction gear and a driving pinion, a support on which the motor and reduction gear are mounted, and positioning means carried by the wagon and unit including a tubular member and a shaft slidably engageable to support the power unit in place on the wagon with said driving pinion in mesh with said gear.

8. In combination with a wagon having unloading means thereon including a movable floor member and a roller about which said floor member passes, a gear connected to said roller for rotating the same, a power unit including a motor, a reduction gear and a driving pinion, a support on which the motor and reduction gear are mounted, positioning means carried by the wagon and unit including a tubular member and a shaft loosely and slidably engageable to support the power unit, said shaft and tubular member being relatively inclined to compensate for looseness therebetween while holding said unit in place on the wagon with said driving pinion in mesh with said gear, and a pin passing through tubular member and shaft for locking the unit in place.

9. In combination with a wagon, unloading mechanism having a movable floor member and a roller about which said floor member passes, a plate located at each side of the wagon and secured thereto, bearing members for said roller mounted on said plates, a gear located adjacent one of said plates and connected to said roller for rotating the same, a power unit for actuating said roller including a motor, a reduction gear and a driving pinion, a support on which said motor and reduction gear are mounted, and cooperating means on said support and on the plate adjacent said gear for removably supporting and holding the power unit with said driving pinion in engagement with said gear.

10. In combination with a wagon, unloading mechanism having a movable floor member and a roller about which said floor member passes, a plate located at each side of the wagon and secured thereto, bearing members for said roller mounted on said plates, a gear connected to said roller for rotating the same, a reinforcing member extending between said plates, a power unit for actuating said roller including a motor, a reduction gear and a driving pinion, a support on which said motor and reduction gear are mounted, and cooperating means on said support and one of said plates for removably supporting and holding the power unit with said driving pinion in engagement with said gear.

11. In combination with a wagon having an unloader therefor including an actuating roller extending across the back of said wagon, bearing means on the wagon in which said roller is journaled for rotation, said roller projecting laterally beyond said bearing means, a motor drive unit for operating said unloader including a driven part coupled to said part of said roller which projects beyond said bearing means, said motor drive unit and said wagon having inter-engaging means for removably supporting the motor drive unit so that the torque reaction of said unit is applied to said wagon during the driving of said roller.

12. In combination with a wagon having an unloader therefor including an actuating roller extending across the back of said wagon, bearing means on the wagon in which said roller is journaled for rotation, a motor drive unit for operating said unloader including a driven part coupled to said roller, said wagon having a bracket fixedly mounted thereon and said motor drive unit having means thereon removably inter-engageable with said bracket to hold the motor drive unit in fixed position with respect to the wagon during operation of said unit and serving to apply the torque reaction of said unit to the wagon during driving of said roller.

THOMAS B. LAVELLE.
ADOLPH F. HERZOG.

REFERENCES CITED

The following references are of record in the file of this patent:

UNITED STATES PATENTS

| Number | Name | Date |
| --- | --- | --- |
| 1,117,268 | Snyder | Nov. 17, 1914 |
| 1,859,133 | Fitzgerald | May 17, 1932 |
| 2,282,699 | Black | May 12, 1942 |
| 2,355,226 | Mallory | Aug. 8, 1944 |
| 2,389,779 | Heller | Nov. 27, 1945 |
| 2,448,122 | Recker | Aug. 31, 1948 |
| 2,488,217 | McCall | Nov. 15, 1949 |